J. SMYTHE.
Harvester-Cutter.

No. 205,766. Patented July 9, 1878.

Witnesses:
Lewis F. Brous,
A. P. Grant.

Inventor:
Job Smythe,
by John A. Wiedersheim
Attorney.

N. PETERS, PHOTO-LITHOGRAPHER, WASHINGTON, D. C.

UNITED STATES PATENT OFFICE.

JOB SMYTHE, OF HALLSPORT, NEW YORK.

IMPROVEMENT IN HARVESTER-CUTTERS.

Specification forming part of Letters Patent No. 205,766, dated July 9, 1878; application filed October 13, 1877.

*To all whom it may concern:*

Be it known that I, JOB SMYTHE, of Hallsport, in the county of Allegany and State of New York, have invented a new and useful Improvement in Cutters of Harvesters and Mowers, which improvement is fully set forth in the following specification and accompanying drawings, in which—

Figure 1:
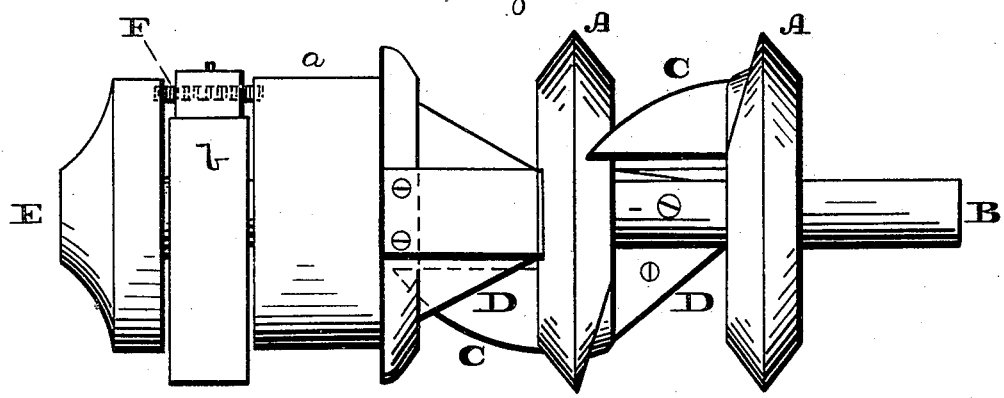
Figure 2:
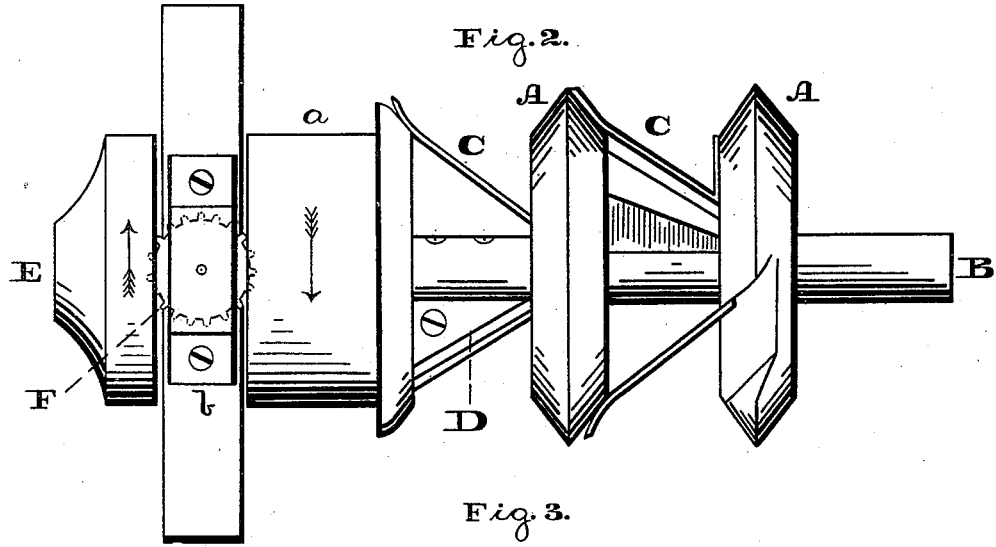
Figure 3:
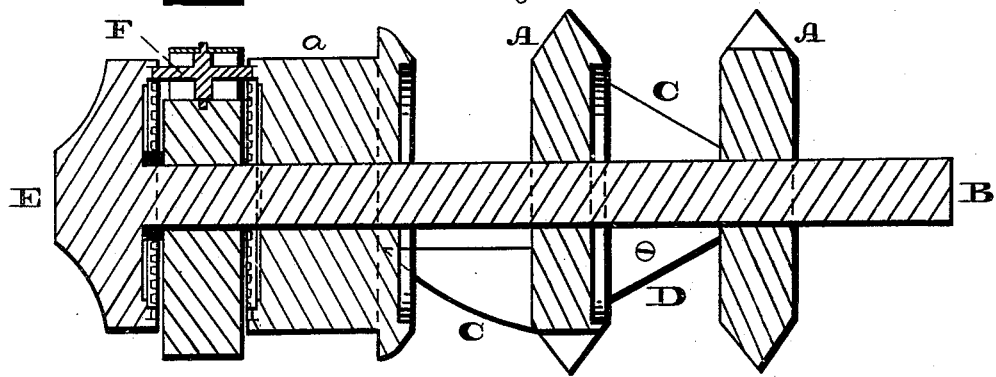

Figures 1 and 2 are face views of the cutter embodying my invention. Fig. 3 is a central longitudinal section thereof.

Similar letters of reference indicate corresponding parts in the several figures.

My invention consists of rotary shears and beds or counterpart cutters, fitted on a shaft common to both.

The shaft is arranged horizontally, and the shears project laterally, so as to ride over the cutting-edges of the bed, whereby the grain or grass will be cut between the cutting-edges of the shears and beds.

Referring to the drawings, A represents a number of rotating heads, mounted on a horizontal shaft, B, and connected together, so as to have a common motion, power being communicated thereto by a pulley, $a$, operated from a proper member or portion of the harvester or mower. These rotating heads carry shears or cutters C, and their beds or counterpart cutters D are secured to the shaft B, so that the rotating shears and counterpart cutters are mounted on the same shaft B.

It will be seen that as the harvester or mower advances and rotation is imparted to the shears C, the cutting-edges of the latter ride over those of the cutters D, and the grain or grass coming in between the two cutting-edges will be severed, which operation will be expeditiously performed, owing to the rapidity with which the shears may rotate.

It will also be seen that the shears and beds fitted to the shaft B require no other means of support.

The shaft B, carrying the shears C, is passed loosely through the heads A and pulley $a$ and a proper portion of the frame of the harvester or mower, and its end has connected to it a toothed wheel, E, which is geared to the pulley $a$ by a gear-wheel, F, properly mounted on the frame $b$; and it will be seen that as the pulley $a$ is rotated motion is imparted to the wheel E in an opposite direction, whereby the shears C revolve around the beds or cutters D in opposite directions, and there are made two or more cuts to one rotation of the shears, whereby the cutting will be rapidly accomplished.

It is evident that power may be communicated directly to the wheel E, and the number of shears on each head and of corresponding cutters D may be increased without varying the principle and operation of my invention.

Having thus described my invention, what I claim as new, and desire to secure by Letters Patent, is—

The series of laterally-projecting shears C and the series of connected beds D, in combination with the horizontal shaft B, both shears and beds being mounted on said shaft, substantially as and for the purpose set forth.

JOB SMYTHE.

Witnesses:
JOHN A. WIEDERSHEIM,
H. E. HINDMARSH.